United States Patent [19]
Buzzi

[11] Patent Number: 5,900,548
[45] Date of Patent: May 4, 1999

[54] DEVICE FOR AUTOMATICALLY LOCKING WHEELS AND THE LIKE ON A BALANCING MACHINE

[76] Inventor: Carlo Buzzi, Via Statale 129A, 22054 Mandello Del Lario, Italy

[21] Appl. No.: 08/936,424

[22] Filed: Sep. 24, 1997

[30] Foreign Application Priority Data

Oct. 8, 1996 [IT] Italy ................................. MI96A2083

[51] Int. Cl.⁶ .................................................... G01M 1/06
[52] U.S. Cl. ............................................................. 73/487
[58] Field of Search ............................ 73/487, 462, 460, 73/484, 485; 157/14, 20, 21; 301/5.21, 5.22; 269/48.1

[56] References Cited

U.S. PATENT DOCUMENTS

| | | | |
|---|---|---|---|
| 4,118,989 | 10/1978 | Wood | 73/487 |
| 4,202,213 | 5/1980 | Toriselli | 73/487 |
| 4,489,608 | 12/1984 | Borner | 73/487 |
| 5,615,574 | 4/1997 | Drechsler et al. | 73/487 |
| 5,777,224 | 7/1998 | Coetsier et al. | 73/487 |

*Primary Examiner*—Hezron Williams
*Assistant Examiner*—Helen C. Kwok
*Attorney, Agent, or Firm*—Guido Modiano; Albert Josif

[57] ABSTRACT

A device for automatically locking wheels on a balancing machine which comprises: a rotating hollow shaft which supports, at one end, a flange for clamping a wheel in a cantilevered fashion; a secondary shaft which can perform a translatory motion within said hollow shaft by means of preloaded springs, so as to keep the secondary shaft shifted away from the clamping flange, thus locking the wheel; a pneumatic cylinder for the translatory motion of the secondary shaft towards the clamping flange, in order to allow the release of the wheel and, simultaneously, a further loading of the springs. For machines of this kind, the locking device according to the present invention has at least two gas springs which are parallel to the secondary shaft and are interposed between a pulley rigidly coupled to the hollow shaft and the free end of the secondary shaft, and a pneumatic cylinde with a stem which acts on the end of the secondary shaft which can preload the gas springs to allow the translatory motion of the secondary shaft towards the clamping flange and therefore allow wheel release. There are also provided stops for stopping the stroke of the secondary shaft and elastic elements for returning the secondary shaft and the stem of the piston to the initial position, thus allowing the gas springs to restore the locking of the wheel.

6 Claims, 2 Drawing Sheets

DEVICE FOR AUTOMATICALLY LOCKING WHEELS AND THE LIKE ON A BALANCING MACHINE

BACKGROUND OF THE INVENTION

The present invention relates to a device for automatically locking wheels, pulleys, disks and particularly motor vehicle wheels on a horizontal-axis balancing machine.

It is known that current and more recent balancing machines for motor vehicle wheels and similar items are usually constituted by a footing which encloses the drive unit and the associated controls for the actuation of an axially hollow shaft which can rotate on bearings and is arranged so as to have a horizontal axis. A substantially dome-shaped flange is coaxially associated with one end of said hollow shaft and is centrally provided with a conical body onto which the usual central cavity of the wheel to be balanced is fitted; a cup-shaped external flange, arranged coaxially to the hollow shaft, is provided to lock the wheel to the rotating dome during rotation of the hollow shaft.

A secondary shaft is installed coaxially to said hollow shaft so that it can perform a translatory motion and act as a tie element; the end of said secondary shaft which lies proximate to the dome can be connected to (and disconnected from) said external flange, which is shaped like a cup or the like, so as to keep the wheel locked on the dome when said tie element is kept pushed towards the end of the hollow shaft which lies opposite to the wheel locking end, with a force which is sufficient to ensure the fixing of the wheel to said dome.

Several systems or devices for locking the wheel to the dome have been proposed which can make the secondary shaft automatically perform a translatory motion inside the hollow shaft towards the opposite end of said hollow shaft.

One of the best-known devices for automatically locking a wheel on a balancing machine of the above-specified type is constituted by a pneumatic cylinder which rotates together with the hollow shaft of the balancing machine; a tie element (secondary shaft arranged inside the rotating hollow shaft) is axially connected to the piston of said cylinder and is capable of applying, by means of the pressure to which it is subjected, to said tie element a force which is sufficient to lock the wheel on the locking dome or flange.

In this case, the cylinder rotates together with the shaft and it is therefore necessary to have a rotating manifold in order to convey the compressed-air supply to the cylinder; this entails an accurate and expensive construction in order to avoid disturbances and vibrations caused by said manifold.

On the other hand, advantageously there is no intrinsic limitation to the stroke of the cylinder and of the tie element; accordingly, it is possible to manufacture centering devices which are particularly practical and efficient for the user.

Another conventional device is constituted by a pack of metal springs installed on the rotating hollow shaft and arranged so as to supply the tie element with an axial force which is capable of retaining the wheel on the clamping device. When the shaft is not rotating, a nonrotating cylinder can preload the springs, so that it is possible to fit the wheel and connect to the tie element the locator bracket which will retain the wheel against the clamping dome or bracket. This device is simpler and less expensive than the previous one, but it has the drawback that it has a limited stroke of the spring. A metal spring whose dimensions are compatible with a wheel balancing machine and whose force is sufficient to clamp a wheel over a stroke of more than a few millimeters is in fact substantially impracticable.

Furthermore, the metal spring is seldom symmetrical and the various compression levels may generate imbalances which cannot be compensated.

This application, owing to the limited stroke which can be achieved on the traction element, forces scarcely practical constructive embodiments of the wheel clamping flange, with the need for adjustment or pre-clamping operations so that the limited stroke is nonetheless sufficient to retain the wheel. If one considers the clamping systems which are normally used, for the sake of the best practicality it is in fact desirable to have a traction element stroke on the order of 70–100 mm, with a minimum force on the order of 250 kg. These results cannot be achieved with conventional systems that use the reaction of springs.

SUMMARY OF THE INVENTION

Accordingly, the aim of the present invention is to provide a device for automatically locking a wheel on a balancing machine which is conceived and structured so as to fully eliminate the drawbacks and limitations of conventional devices and most of all is such as to lock with sufficient force the wheel to the flange or dome of the balancing machine without this force being discharged onto the bearings which support the rotating hollow shaft.

Another object of the present invention is to provide a device for automatically locking the wheel or the like onto the rotating flange which uses elastic means to provide the clamping force required for the calibration operations, said means being such as to allow high and constant elastic deformations at the various compression values and therefore a tie element stroke which is greater than the one allowed by conventional systems with metal springs, with evident advantages as regards the stability of the clamping of the wheel and user practicality during operation.

Another object of the invention is to provide a locking device of the type specified above which is structurally simple and easy and is quick to operate during the release of the wheel after the balancing step.

This aim, these objects, and others which will become apparent from the following detailed description are achieved by a device for automatically locking wheels and the like, particularly motor vehicle wheels, on balancing machines which comprises: an axially hollow shaft which is mounted so that it can rotate horizontally on bearings and supports, at one end; a conventional clamping flange provided with a conical support for centering the wheel to be balanced; a secondary shaft which acts as a tie element and is mounted so that it can freely perform a translatory motion within said hollow shaft and supports means, shaped like a cup or the like, for locking the wheel onto said clamping flange; and spring-loading means, which are arranged coaxially to the other end of said secondary shaft and of said hollow shaft, are compressed so as to keep said secondary shaft shifted away from said clamping flange, in order to allow the stable locking of the wheel, and are then further compressed through a pneumatic cylinder to make said secondary shaft perform a translatory motion towards said clamping flange, in order to allow the release of said cup; said device having, according to the present invention, spring-loading means for keeping the wheel closed on the clamping flange, said means being constituted by at least two pneumatic springs, substantially of the compressed-air type, which are arranged parallel to said secondary shaft and are interposed between a pulley rigidly coupled to the free end of said hollow shaft and a pivot rigidly coupled to the secondary shaft and to the free ends of said springs, so as to keep the wheel stably locked on the clamping flange during balancing; a pneumatic cylinder-and-piston unit being arranged at the free end of said secondary shaft so that its stem is in contact with the end of the secondary shaft so as to allow, at the end of the balancing operation and while the piston is operating, said pivot axially aligned with the ends of said springs to perform a translatory motion and thus preload said springs and make the secondary shaft perform a translatory motion towards the clamping flange and thus allow to remove the wheel; stop means being provided to delimit the stroke of said secondary shaft during translatory motion towards the clamping flange; elastic means being further provided for returning the secondary shaft and the stem of the piston to the initial position, in order to allow the pneumatic springs to reestablish the stable locking of another wheel.

More particularly, said pneumatic spring-loading means are preferably constituted by two identical cylindrical gas springs (of the compressed-air type), which are freely accommodated with one end in seats formed in said pulley which is rigidly coupled to the hollow shaft and has, at the opposite end, rod-shaped elements for providing said additional compression, the opposite ends of said rod-shaped elements, rigidly coupled to the springs, being interconnected by a pivot which is inserted transversely in the end of the traction element.

Said means for stopping the stroke of the traction element required to release the wheel are also constituted by a disk or the like, which is coaxial to the traction element and is supported peripherally by at least two flexible-lamina elements of preset length which are stably connected to the cylinder body, and by a similar disk supported, by means of two traction elements, by the pulley which is rigidly coupled to the hollow shaft, the stroke of the traction element being determined by the contact between said two disks during the translatory motion of the traction element performed by the stem of the piston.

Likewise, said return means for the traction element (and therefore for the rod-shaped means for preloading the springs) are constituted by lamina elements whose dimensions are such that they flex during the spring preloading stroke and react elastically when the piston step applies no pressure, returning the traction element and the piston stem in contact therewith to an inactive position.

BRIEF DESCRIPTION OF THE DRAWINGS

Further characteristics and advantages of the present invention will become apparent from the following detailed description thereof, given with reference to the accompanying drawings, which are provided only by way of non-limitative example and wherein.

DESCRIPTION OF THE PREFERRED EMBODIMENTS

Figure 1:
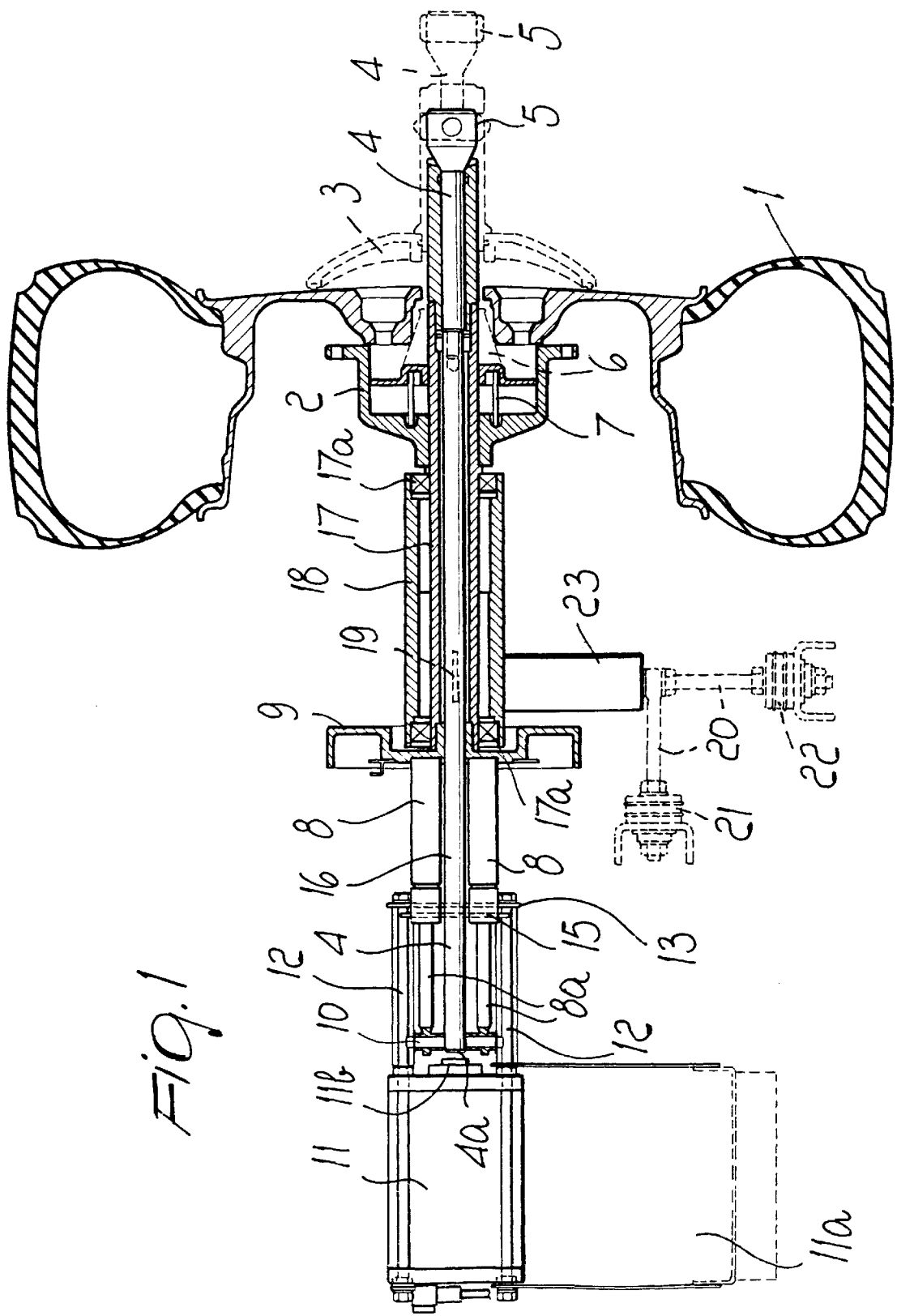
FIG. 1 is an axial sectional view of the device for automatically locking a wheel on a balancing machine, executed according to the invention and shown in the stable locking position.

With reference to the above figures, the device according to the invention is applied to a conventional balancing machine, i.e., a machine which has compressed spring-loading means for keeping a wheel stably closed on a rotating hollow shaft, and a secondary shaft or traction element which can perform a translatory motion axially within said hollow shaft and is actuated by the stem of a piston of a pneumatic cylinder only during the release of the wheel from the balancing machine.

More particularly, the device according to the invention comprises a wheel 1, for example a motor vehicle wheel, which is keyed (clamped) on the centering flange 2, shaped like a dome or the like, by means of a cup 3 (or clamp with a plurality of pins) which is subjected to traction through a tie rod or secondary shaft 4 which is coaxially inserted in a horizontal hollow shaft 17 to which said centering flange 2 is rigidly coupled.

The tie rod 4 has a translatory stroke which allows to extract the cup 3, and therefore the wheel, through the simple manual rotation of a revolving plug 5, as in most conventional balancing machines.

The wheel 1 is centered on the dome-shaped flange 2 by fitting it on the cone 6 which is arranged opposite to a pusher spring 7.

According to the invention, the hollow shaft 17, which has a limited length, is installed so that it can rotate but not perform a translatory motion within a sleeve-shaped hollow supporting body 18 by means of bearings 17a; the support 18 is stably supported by the footing (not shown) of the balancing machine by means of a lamina element 19, whilst the rotation of the hollow shaft 17 and of the corresponding centering bracket 2 is generated by a toothed wheel (or belt) which engages the peripheral region of said bracket 2 and is actuated by the drive unit accommodated in the footing of the balancing machine.

A pulley 9 is anchored coaxially at the free end of the hollow body 17 which lies opposite to the one supporting the centering bracket 2; two recesses are formed in the face of said pulley which is directed to the left in the figures and freely accommodate an end of two gas springs 8 (substantially of the compressed-air type) whose axis is parallel to the axis of the tie rod 4.

Two stems 8a are axially anchored to the opposite ends of said gas springs 8 and are also parallel to the tie rod 4; their free ends are interconnected by a pin 10 which passes through the free end of said tie rod 4.

The gas springs are therefore interposed between said pulley 9 and said transverse pin 10, and with this arrangement the force applied by the loaded springs keeps the tie rod 4 pushed to the left (in the figures), thus locking the wheel on the centering flange 2.

The air springs 8 and the tie rod 4 can rotate freely together with the pulley 9 and with the end pin 10.

Downstream of the pin 10 there is a pneumatic cylinder 11 which is supported by a flexible-lamina support 11a; a stem is rigidly coupled to the piston of said cylinder, and the end 11b of said stem is coaxially adjacent to the free end 4a of the tie rod 4 when the device is in the locking position (FIG. 1).

Figure 2:
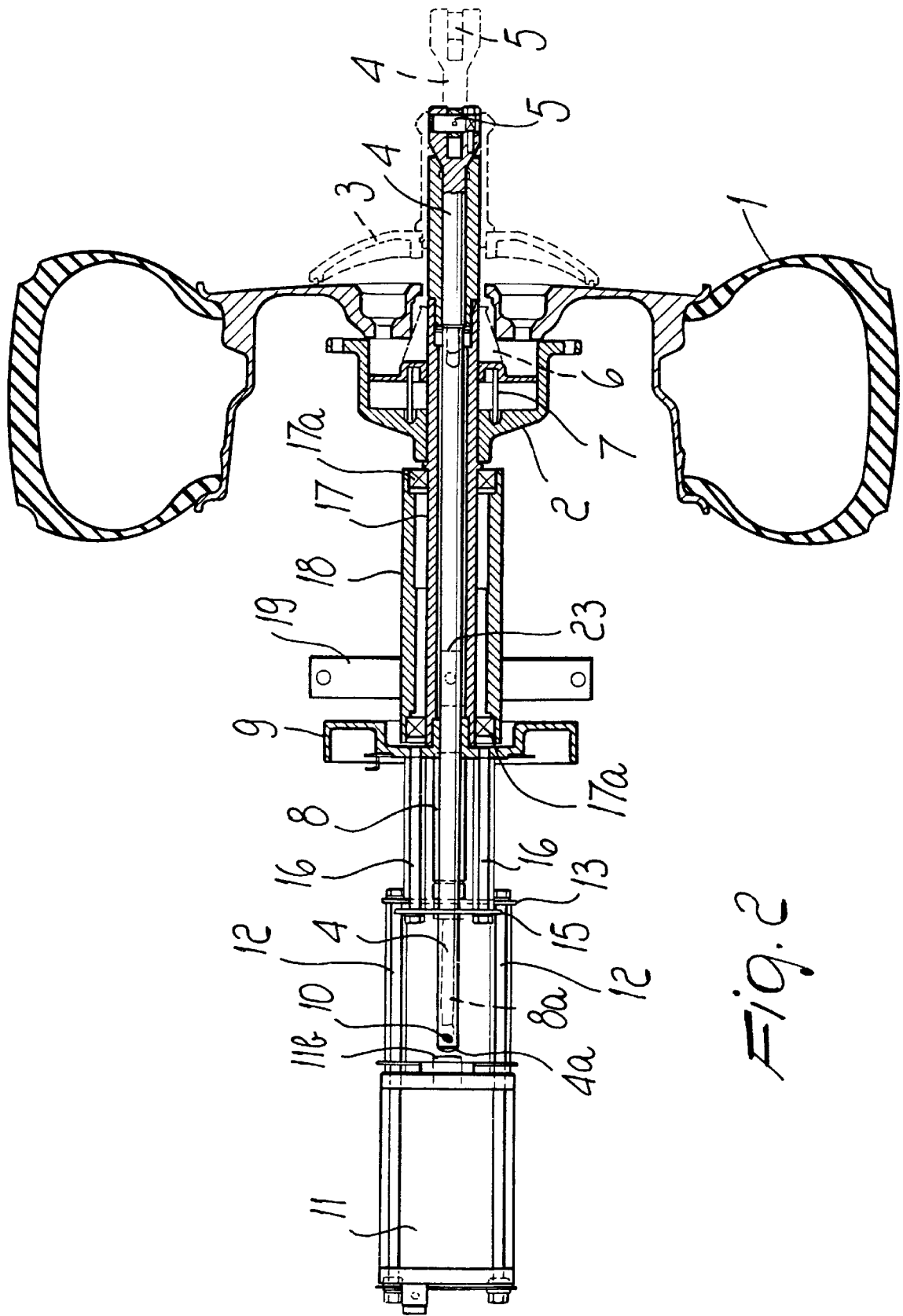
FIG. 2 is a sectional view of the same device of FIG. 1, taken at 90° with respect to the first view, the device being shown in the position for releasing the wheel from the balancing machine.

Two flexible-lamina tie elements 12, parallel to the tie rod 4, are further associated with the cylinder 11, and a disk 13 is associated with the opposite free ends of said tie elements 12 and is coaxial to the tie rod 4; a second disk 15, parallel to the disk 13, is instead supported by the pulley 9 by means of two tie bar elements 16 which are also parallel to the tie rod 4 (FIG. 2).

The disk 15 can therefore rotate together with the pulley, without axial movements, whilst the disk 13, which is parallel thereto and at a preset distance therefrom, is subjected to movements towards the disk 15 and up to contact therewith when the lamina elements 12 that support it are subjected to axial compression, as will become apparent hereinafter.

Therefore, the force for the stable locking of the wheel on the centering bracket during the balancing step is ensured by the pressure of the air springs 8, which keep the tie rod 4 shifted to the left, as shown in FIG. 1, when the cylinder 11 is not operating.

In order to unload the wheel, i.e., in order to remove the claw-fitted cup 3 from the centering flange 2, it is necessary to load the springs 8 further, so as to make the tie rod 4 perform a translatory motion by an extent which is determined by the extent of the movement of the disk 13 in order to make contact with the disk 15.

In order to achieve this movement of the tie rod 4 to the right (FIG. 2), the cylinder 11 is activated; by means of the end 11*b* of its stem, it pushes the tie rod 4, further compressing the gas springs, and simultaneously flexes the laminae 12 which support the disk 13. The stroke of the tie rod 4 is stopped when the disk 13 (which moves towards the disk 15 owing to the flexing of the laminae 12 and is supported by the tie bars 16 connected to the pulley 9) makes contact with said disk 15.

In this manner, the force required to further load the springs 8 is not discharged onto the bearings 17*a,* with evident advantages as regards the lack of wear thereof and the onset of imbalances and vibrations which are harmful to correct wheel balancing.

Also according to the invention, in addition to the above advantages and characteristics, the device according to the invention has an elastic support (with a flexible lamina 11*a*) for the cylinder and an elastic lamina 19 for supporting the sleeve 18 of the hollow shaft, which allow additional advantages.

Said laminae are in fact sized so as to flex at right angles to the rotation axis of the shafts 4 and 17 and so as to simultaneously twist about an axis directed at right angles to the plan that contains the axes of the hollow shaft and of the sleeve 18; the detection of these imbalances (torsions and flexings) can be advantageously assigned to two sensors, substantially conventional piezoelectric transducers, of which one is designated by the reference numeral 21 and is sensitive to the flexings of the supporting laminae 9 and 11*a* and the other one, designated by the reference numeral 22 in FIG. 1, is sensitive to the torsions of said laminas.

Said transducers are supported by two tie elements 20 which are at 90° to each other and are anchored to the end of a lamina 23 which is rigidly coupled to the fixed support 18. The arrangement of said transducers outside the hollow shaft allows to reduce the length of the shafts 4 and 17, with obvious advantages as regards the possibility of reducing the length of said shafts.

The invention which is described above according to one of its possible embodiments is of course susceptible of numerous structurally and functionally equivalent modifications and variations in practical execution without thereby abandoning the scope of the protection of the invention.

What is claimed is:

1. A device for automatically locking a wheel shaped element, particularly a motor vehicle wheel, on a balancing machine comprising:

an axially hollow shaft rotatably mounted horizontally on bearings;

a clamping flange for centering the wheel to be balanced, said clam flange being supported at a first end of said hollow shaft;

a secondary shaft acting as a tie rod and mounted to freely perform a translatory motion within said hollow shaft, said secondary shaft being further spring loaded it a free end thereof for being shifted away from said clamping flange for stable locking of the wheel;

a locking element for locking the wheel onto said clamping flange;

a pneumatic cylinder operative to make said secondary shaft perform a translatory motion towards said clamping flange for releasing said locking element;

at least two gas springs each interconnected between said secondary shaft and said hollow shaft and each extending parallel to said secondary shaft for providing a biasing force on said secondary shaft in a direction parallel to said secondary shaft for biasing said secondary shaft in said hollow shaft away from said clamping flange;

a pulley being rigidly coupled to a second free end of said hollow shaft;

said gas springs being connected to said secondary shaft by means of a pin diametrically rigidly coupled to the secondary shaft and to free ends of said gas springs, so as to keep the wheel stably locked on the clamping flange during balancing, said gas springs being interposed between said pulley and said pin;

said pneumatic cylinder including a cylinder-and-piston-stem unit which is arranged adjacent said free end of said secondary shaft so that a stem of a piston of said cylinder-and-piston-stem unit is in contact with the free end of the secondary shaft while the piston is operating during a late stage of balancing so as to allow said pin and said gas springs to perform a translatory motion and thus preload said gas springs and make the secondary shaft perform a translatory motion towards the clamping flange for allowing removal of the wheel.

2. The locking device of claim 1, wherein said gas springs are constituted by two identical gas springs of a compressed-air type which are freely accommodated with a first end thereof within seats formed in said pulley, said pulley being rigidly coupled to said hollow shaft, said gas springs having, at second ends thereof, stem-shaped elements for providing further compression of the gas springs, free ends of said stem-shaped elements being interconnected by the pin which is inserted transversely and diametrically in the free end of the secondary shaft.

3. The locking device of claim 2, further comprising stop means for delimiting a stroke of said secondary shaft during translatory motion towards the clamping flange, wherein said stop means comprise:

a first disk which is coaxial to the secondary shaft;

at least two flexible lamina elements of preset length which are stably connected to a body of the pneumatic cylinder and support peripherally said first disk;

a second disk;

at least two tie elements connected to the pulley which is rigidly coupled to the hollow shaft, said tie elements supporting said second disk whereby a stroke of the secondary shaft is delimited when contact between said first and second disks occurs during the translatory motion of the secondary shaft produced by the stem of the piston.

4. The locking device of claim 3, further comprising elastic means for returning the secondary shaft and the stem of the piston to an initial position for allowing the gas springs to reestablish a stable locking of a further wheel, wherein said elastic means are constituted by said at least two tie elements in the form of lamina elements, which have such dimensions as to flex during a preloading stroke of the gas springs and react elastically in absence of pressure from the stem of the piston for returning the secondary shaft and the stem of the piston in contact with the secondary shaft into an inactive position.

5. The locking device of claim 1, wherein said pneumatic cylinder is fitted on a flexible lamina support, the locking device being connected to the balancing machine through a further flexible lamina.

6. The locking device of claim 5, further comprising:

a tubular body for supporting the rotatable hollow shaft;

at least one flexible supporting lamina being associated with said tubular body;

tie elements being supported on said at least one supporting lamina at right angles to each other; and piezoelectric sensors supported on said tie elements for detecting both flexings and torsions of said flexible lamina support that supports the pneumatic cylinder and of said further flexible lamina supporting the locking device.

* * * * *